H. L. STEVENS.
PNEUMATIC SPRAYER.
APPLICATION FILED AUG. 1, 1916.

1,229,344.   Patented June 12, 1917.

WITNESS
O. Johnson

INVENTOR
Howard L. Stevens

BY
C. D. Haskins
ATTORNEY

UNITED STATES PATENT OFFICE.

HOWARD L. STEVENS, OF EVERETT, WASHINGTON.

PNEUMATIC SPRAYER.

1,229,344.     Specification of Letters Patent.     Patented June 12, 1917.

Application filed August 1, 1916. Serial No. 112,609.

*To all whom it may concern:*

Be it known that I, HOWARD L. STEVENS, citizen of the United States, residing at Everett, in the county of Snohomish and State of Washington, have invented a certain new and useful Improvement in Pneumatic Sprayers, of which the following is a specification.

My invention relates to improvements in pneumatic devices which are employed for various purposes, as, for instance, spraying paint upon a surface to be painted, or removing dust from a floor or carpet, and the more important object of my invention is to provide a pneumatic paint sprayer that shall be efficient and reliable in its operation and which shall embody a novel form of nozzle and a series of vacuum jets, all members of which shall be of such improved form of construction as shall adapt them to be quickly made and assembled by one who is not a skilled mechanic.

Figure 1:
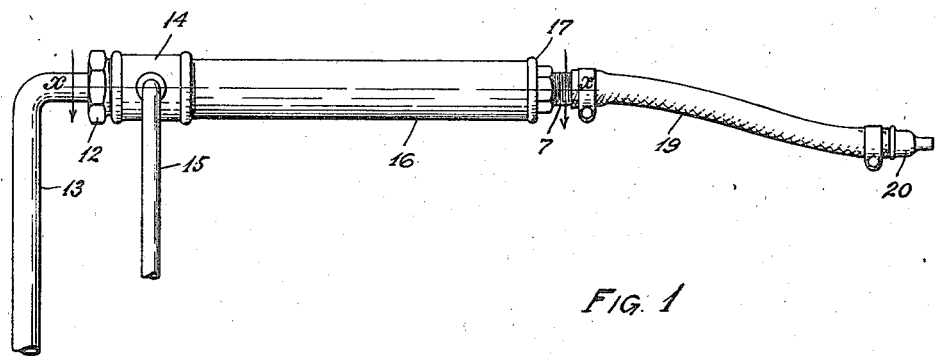
Figure 2:
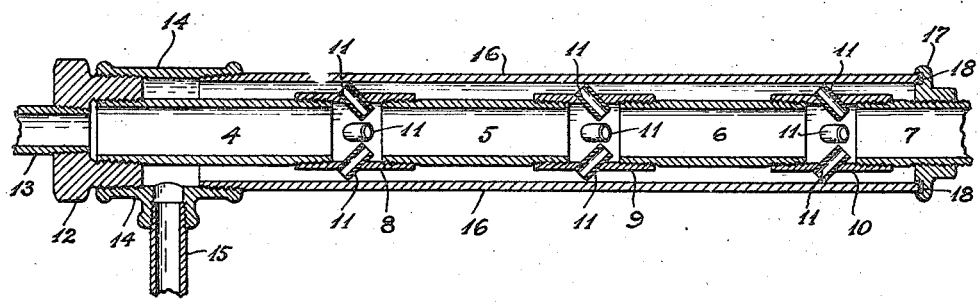
Figure 3:
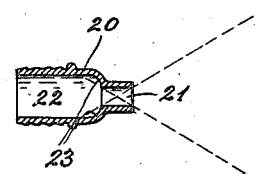

I accomplish this object by devices illustrated in the accompanying drawing whereof in Figure 1 is a view in side elevation of one form of a paint sprayer embodying my invention; Fig. 2 is a view in longitudinal mid-section, on broken line $x$, $x$ of Fig. 1, of associated parts of the same; and Fig. 3 is a view in longitudinal mid-section of a nozzle forming a part of the same.

Referring to the drawings, throughout which like reference numerals indicate like parts, in Fig. 2 the numerals 4, 5, 6 and 7 designate short sections of metal pipe spaced from each other and connected together in series by screw-threaded pipe couplings 8, 9 and 10 of standard form.

Extending obliquely through the wall of each of the couplings 8, 9 and 10 are a plurality of radial holes within each of which holes is disposed a tightly fitting short section of a tube, as tubes 11, all of which tubes 11 project their inner end portions into the passageway through said couplings 8, 9 and 10, whereby when air under pressure flows through said tubes 11 into the passageway formed by the sections 4, 5, 6 and 7 of pipe and the couplings 8, 9 and 10 such air will flow toward and through the section 7.

On the left-hand end of the section 4 is screwed an annular coupling 12 which connects with a suction pipe 13 that may be extended to project an end portion of it beneath the surface of a body of liquid paint not shown.

The externally screw-threaded end portion of the coupling 12 is screwed into a T fitting 14 which is disposed to surround said section 4 in a position concentric therewith, whereby there is formed an annular space between the interior surface of said T fitting 14 and the exterior surface of the section 4 and into the side opening of said T fitting 14 is screwed a pipe 15 which may be extended to a source of compressed air.

Disposed concentrically to surround the sections 4, 5 and 6 and an end portion of section 7 and the couplings 8, 9 and 10 with the tubes 11 therein, is a larger pipe 16, the left-hand end of which is screwed into the right-hand end of the T fitting 14, and the right-hand end of which projects into an annular groove formed in the side of a collar 17 which is provided with an internal screw-thread and which is adjustably mounted on a screw-threaded portion of the section 7.

Within the annular groove of the collar 17 is disposed a yielding gasket 18 whereby when the collar 17 is rotatively moved in a clockwise direction, then such gasket 18 will be forced against the adjacent end surface of the pipe 16 thereby to make an air-tight joint and to maintain the pipe 16 in its concentric position around the sections 4, 5, 6 and 7.

As shown in Fig. 1, attached to the outer end of the section 7 is one end of a flexible hose 19 whose other end is provided with a nozzle 20.

The passageway through the nozzle 20 is of such special form as will adapt it to cause a spraying of any liquid that is forced by pressure to flow therethrough provided such liquid be mixed with a suitable quantity of compressed air, steam or other gaseous fluid, which form of passageway is illustrated by Fig. 3 which shows said nozzle 20 by a view in longitudinal mid-section and wherein the delivery portion 21 of said passageway is of a diameter that is equal to about one-half of the diameter of the intake portion 22 whereby there is formed a curved annular shoulder 23 between the intake portion 22 and the delivery portion 21.

The length of the delivery portion 21 of the passageway is determined by the diverging lines of desired cone of the spraying liquid emitted from the nozzle, as, for instance, in Fig. 3 the diverging dotted lines indicate the conical boundary of the spray that would be emitted through a delivery passageway of a nozzle of the proportions of the nozzle 20.

In the operation of that form of my invention illustrated by Figs. 1, 2 and 3, the pipe 13 is extended to project beneath the surface of the liquid to be sprayed, as, for instance, liquid paint, and the pipe 15 is connected to a source of highly compressed air, the passageways through said pipes 13 and 15, preferably being controlled by a valve, not shown, and upon opening such valves compressed air will be emitted through the pipe 15 into the annular space between the inner surface of the pipe 16 and the exterior surfaces of the sections 4, 5, 6 and 7 and their connecting coupling 8, 9, and 10, and from such annular space the compressed air will flow with great force through the tubes 11 into the passageway through the hose 19 and nozzle 20, thus to create a vacuum which will suck the paint through the pipe 13 and section 4, thence into and through sections 5, 6 and 7, and in passing through the couplings 8, 9 and 10 the paint will be thoroughly mixed with air thus to form an aerated mixture which, entering the intake portion 22 of the nozzle 20, will impinge portions of it against the curved shoulder 23 to be deflected diagonally through the delivery passageway 21 to be emitted therefrom in the form of spray which is diffused in diverging lines, as indicated by the dotted lines in Fig. 3, thus evenly to deposit a coating of paint over surfaces of large area.

Obviously, the structure illustrated in the accompanying drawings, may also be embodied in a vacuum sweeper by removing the nozzle 20 and substituting a suction hose, provided with a vacuum sweeping tool, in place of the pipe 13, in which case the hose 19 would be disposed to lead into a suitable dust receptacle.

Manifestly, changes may be made in the number and dimensions of the sections 4, 5 6 and 7 and in the number of and dimensions of tubes 11, and the dimensions and shape of the tube 16 may be changed without departing from the spirit of my invention.

What I claim is:

A pneumatic device of the class described, which embodies a series of sections of pipe disposed with their axes in the same line and spaced from each other; a coupling disposed to extend between and connect the adjacent end portions of adjacent ones of said sections; a plurality of tubes disposed to extend obliquely through the wall of each of said couplings to project into the passageway therethrough; a valve-controlled suction pipe; an annular coupling disposed to connect said suction pipe with one end of said series of sections of pipe, said annular coupling being provided with an external screw-thread; a collar disposed on the other end portion of said series of sections of pipe; a larger pipe disposed to surround said series of sections of pipe and said couplings in a position concentric therewith to form an annular space between the inner surface of said larger pipe and the outer surfaces of said series of sections of pipe; a T fitting screwed on to the exterior screw-thread of said annular coupling and disposed to extend to and connect with the adjacent end of said larger pipe, the other end of said larger pipe engaging with said collar tightly to close said annular space; a valve-controlled pipe connected with the side entrance of said T fitting and disposed to extend to and connect with a source of compressed air; a hose having one of its ends connected to that end of said series of pipes adjacent to said collar; and a nozzle connected with the other end of said hose.

In witness whereof, I hereunto subscribe my name this 25th day of July, A. D. 1916.

HOWARD L. STEVENS.

Witnesses:
FRANK WARREN,
O. JOHNSON.